US012610352B2

(12) United States Patent
Cakulev et al.

(10) Patent No.: US 12,610,352 B2
(45) Date of Patent: Apr. 21, 2026

(54) SYSTEMS AND METHODS FOR SUPPORTING USAGE LIMITS FOR A GROUP OF USER EQUIPMENT BASED ON NETWORK SLICE ADMISSION CONTROL AND POLICY AND CHARGING CONTROL

(71) Applicant: Verizon Patent and Licensing Inc., Basking Ridge, NJ (US)

(72) Inventors: Violeta Cakulev, Milburn, NJ (US); Lixia Yan, Basking Ridge, NJ (US); Hossein M. Ahmadi, Parsippany, NJ (US); Ali Imdad Malik, East Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 327 days.

(21) Appl. No.: 18/334,792

(22) Filed: Jun. 14, 2023

(65) Prior Publication Data

US 2024/0422745 A1 Dec. 19, 2024

(51) Int. Cl.
| | |
|---|---|
| *H04W 72/04* | (2023.01) |
| *H04W 72/0446* | (2023.01) |
| *H04W 72/23* | (2023.01) |

(52) U.S. Cl.
CPC ....... *H04W 72/0446* (2013.01); *H04W 72/23* (2023.01)

(58) Field of Classification Search
CPC . H04W 72/23; H04W 72/0446; H04W 48/18; H04W 48/16; H04W 52/26; H04W 72/044; H04L 12/1407; H04L 41/5029; H04L 12/14
See application file for complete search history.

(56) References Cited

U.S. PATENT DOCUMENTS

| | | | | |
|---|---|---|---|---|
| 2018/0220276 A1* | 8/2018 | Senarath | ........... | H04M 15/8016 |
| 2019/0174466 A1* | 6/2019 | Zhang | ................... | H04L 5/0057 |
| 2020/0045519 A1* | 2/2020 | Raleigh | ................... | H04W 4/08 |
| 2024/0073802 A1* | 2/2024 | Velev | ................... | H04W 48/18 |

* cited by examiner

*Primary Examiner* — Wei Zhao

(57) ABSTRACT

A network device of a network may generate a request for a usage limit control associated with a plurality of user equipments (UEs) registered with the network, and may provide the request for the usage limit control to another network device of the network. The network device may receive, based on the request, the usage limit control from the other network device, and may determine a modified policy for the plurality of UEs based on the usage limit control. The network device may cause the modified policy to be implemented for the plurality of UEs.

20 Claims, 7 Drawing Sheets

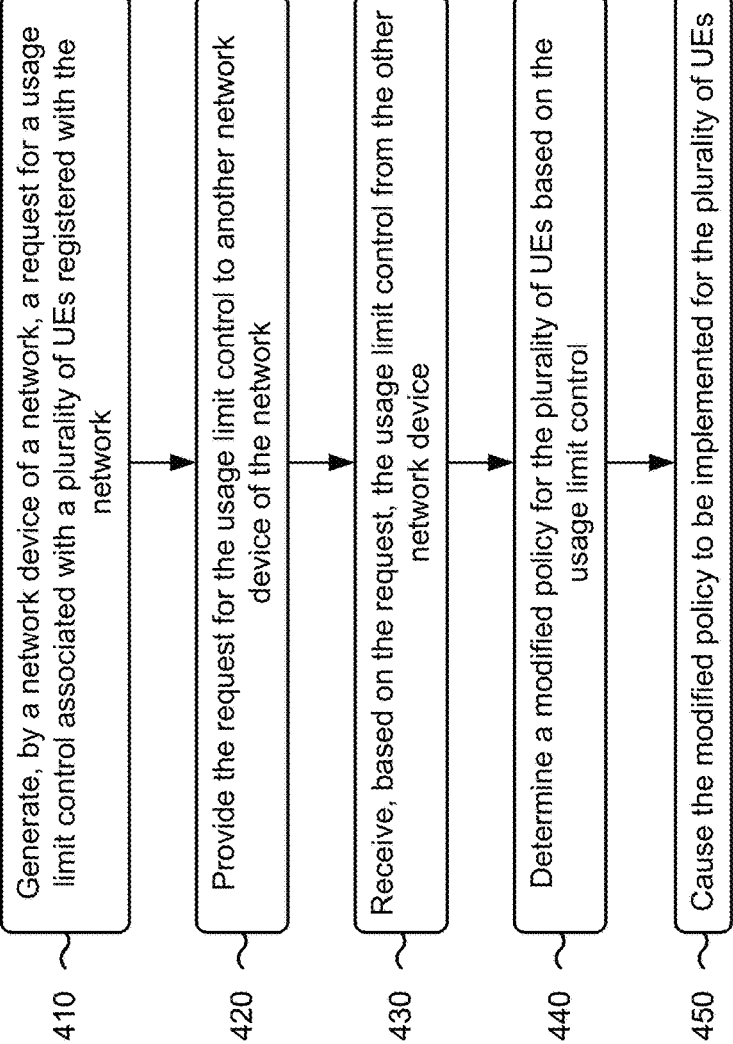

400

410 Generate, by a network device of a network, a request for a usage limit control associated with a plurality of UEs registered with the network 420 Provide the request for the usage limit control to another network device of the network 430 Receive, based on the request, the usage limit control from the other network device 440 Determine a modified policy for the plurality of UEs based on the usage limit control 450 Cause the modified policy to be implemented for the plurality of UEs

FIG. 4

SYSTEMS AND METHODS FOR SUPPORTING USAGE LIMITS FOR A GROUP OF USER EQUIPMENT BASED ON NETWORK SLICE ADMISSION CONTROL AND POLICY AND CHARGING CONTROL

BACKGROUND

The Third Generation Partnership Project (3GPP) defined a mechanism that enables a policy control function (PCF) to make policy decisions based on subscriber usage limits.

BRIEF DESCRIPTION OF THE DRAWINGS

FIG. 4 is a flowchart of an example process for supporting usage limits for a group of UEs based on NSAC and policy and charging control.

DETAILED DESCRIPTION OF EXAMPLE EMBODIMENTS

Figure 1A:
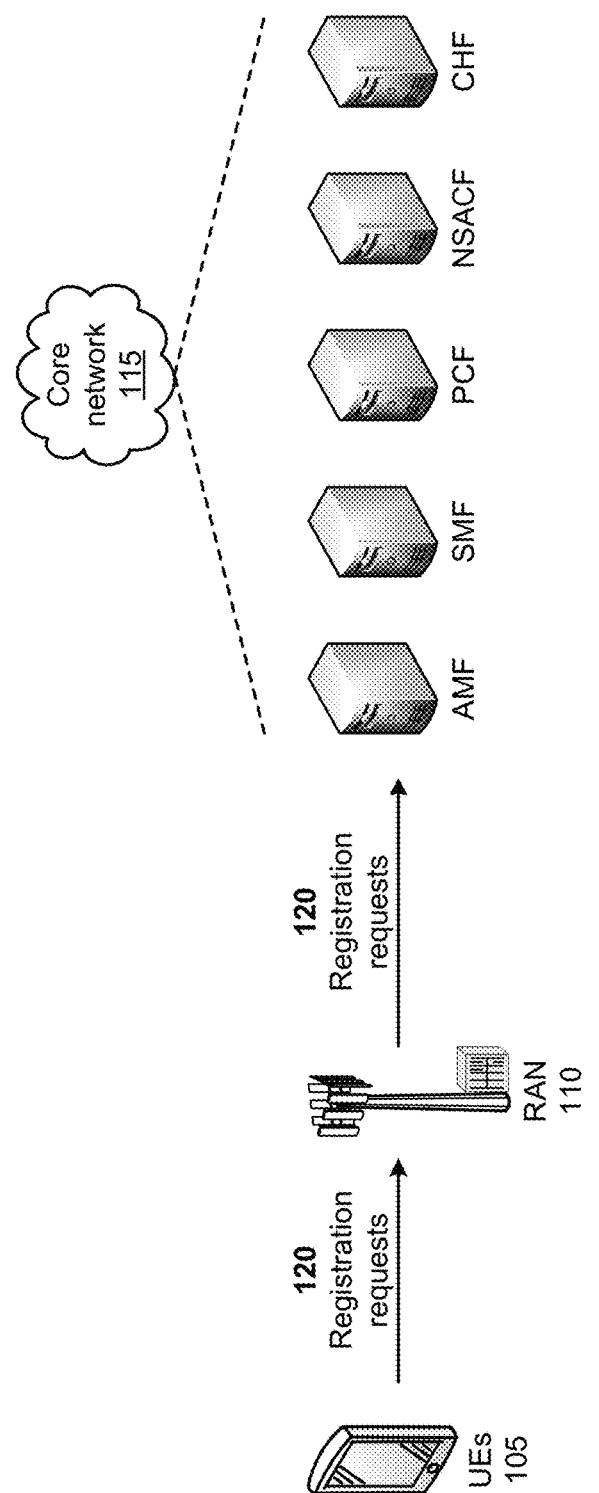
FIGS. 1A-1D are diagrams of an example associated with supporting usage limits for a group of user equipments (UEs) based on network slice admission control (NSAC) and policy and charging control.

The following detailed description of example implementations refers to the accompanying drawings. The same reference numbers in different drawings may identify the same or similar elements.

The 3GPP standards define an interaction between the PCF and a charging function (CHF) where the PCF may obtain policy counters for usage limits that are maintained in the CHF. Using this mechanism, a core network may provide services in which the PCF controls a maximum throughput that a subscriber will receive or a priority for subscriber traffic based on the CHF usage limit information. This may enable the core network to tune quality of service (QoS) and priority attributes based on monthly throughput limits (e.g., full speed for a quantity of gigabyte (GB) usage and then reduced speed for a remainder of a month), time-of-day limits (e.g., reduced speed during peak hours but greater speeds on nights and weekends), temporary promotions (e.g., greater speeds for twenty-four hours for an additional fee), and/or the like. In addition, the 3GPP standards define a network slice admission control function (NSACF) that monitors and controls a quantity of registered UEs per network slice and/or a quantity of protocol data unit (PDU) sessions per network slice for network slices subject to network slice admission control (NSAC). The NSACF is configured with a maximum quantity of UEs and/or a maximum quantity of PDU sessions allowed to be served per single-network slice selection assistance information (S-NSSAI). The NSACF is also configured with information indicating applicable access types for the S-NSSAI (e.g., a 3GPP access type, a non-3GPP access type, or both).

However, the standards fail to support usage limits for a group of UEs and usage limits based on NSAC. Currently there is no mechanism for a consumer network function (e.g., a PCF) to subscribe to usage limits for a group of UEs, and there is no mechanism to perform NSAC based on usage limits maintained by the CHF. Thus, current network configurations consume computing resources (e.g., processing resources, memory resources, communication resources, and/or the like), networking resources, and/or other resources associated with failing to implement usage limits for a group of UEs, failing to implement usage limits for a quantity of PDU sessions, failing to perform NSAC for a group of UEs and/or PDU sessions based on usage limits, and/or the like.

Some implementations described herein provide a network device that supports usage limits for a group of UEs based on NSAC and policy and charging control. For example, a network device of a network may generate a request for a usage limit control associated with a plurality of UEs registered with the network, and may provide the request for the usage limit control to another network device of the network. The network device may receive, based on the request, the usage limit control from the other network device, and may determine a modified policy for the plurality of UEs based on the usage limit control. The network device may cause the modified policy to be implemented for the plurality of UEs.

In this way, the network device supports usage limits for a group of UEs based on NSAC and policy and charging control. For example, the PCF, the NSACF, and the CHF may be configured to support group-based usage limits and to enable the PCF and the NSACF to make determinations based on usage limits for a group of UEs. In particular, when subscribing for usage limits (e.g., policy counters), the PCF and/or the NSACF may subscribe to usage limits based on a group identifier (e.g., for a group UEs) or based on multiple UE identifiers. Upon receiving a notification from the CHF (e.g., that identifies the usage limits), the PCF and/or the NSACF may determine a policy for a group of UEs based on the received usage limits. The notification from the CHF may cause the PCF to update multiple access management (AM), session management (SM), and UE policy control policy sessions based on the group identifier or the UE identifiers associated with the notification. Thus, the network device may conserve computing resources, networking resources, and/or other resources that would have otherwise been consumed by failing to implement usage limits for a group of UEs, failing to implement usage limits for a quantity of PDU sessions, failing to perform NSAC for a group of UEs and/or PDU sessions based on usage limits, and/or the like.

FIGS. 1A-1D are diagrams of an example 100 associated with supporting usage limits for a group of UEs based on NSAC and policy and charging control. As shown in FIGS. 1A-1D, example 100 includes UEs 105, a RAN 110, and a core network 115 that includes an access and mobility management function (AMF), a session management function (SMF), a policy control function (PCF), a network slice access control function (NSACF), and a charging function (CHF). Further details of the UEs 105, the RAN 110, the core network 115, the AMF, the SMF, the PCF, the NSACF, and the CHF are provided elsewhere herein.

As shown in FIG. 1A, and by reference number 120, the UEs 105 may provide registration requests (e.g., PDU session establishment requests) to the RAN 110, and the RAN 110 may provide the registration requests to the core network 115 (e.g., to the AMF). For example, the UEs 105 may attempt to establish PDU sessions with the core network 115, via the RAN 110, in order to communicate with other UEs 105, an application server, a cloud computing environment, and/or the like. In order to establish the PDU sessions, the UE 105 may generate requests to establish PDU sessions with the RAN 110 and the core network 115. The registration requests may also include credentials of users of the UEs 105, identifiers of the UEs 105, and/or the like. The UEs 105 may provide the registration requests to the RAN 110, and the RAN 110 may forward the registration requests to the AMF. The AMF may receive the registration requests from the RAN 110. In some implementations, a quantity of the UEs 105 may be registered with a network slice of the core network 115.

Figure 1B:
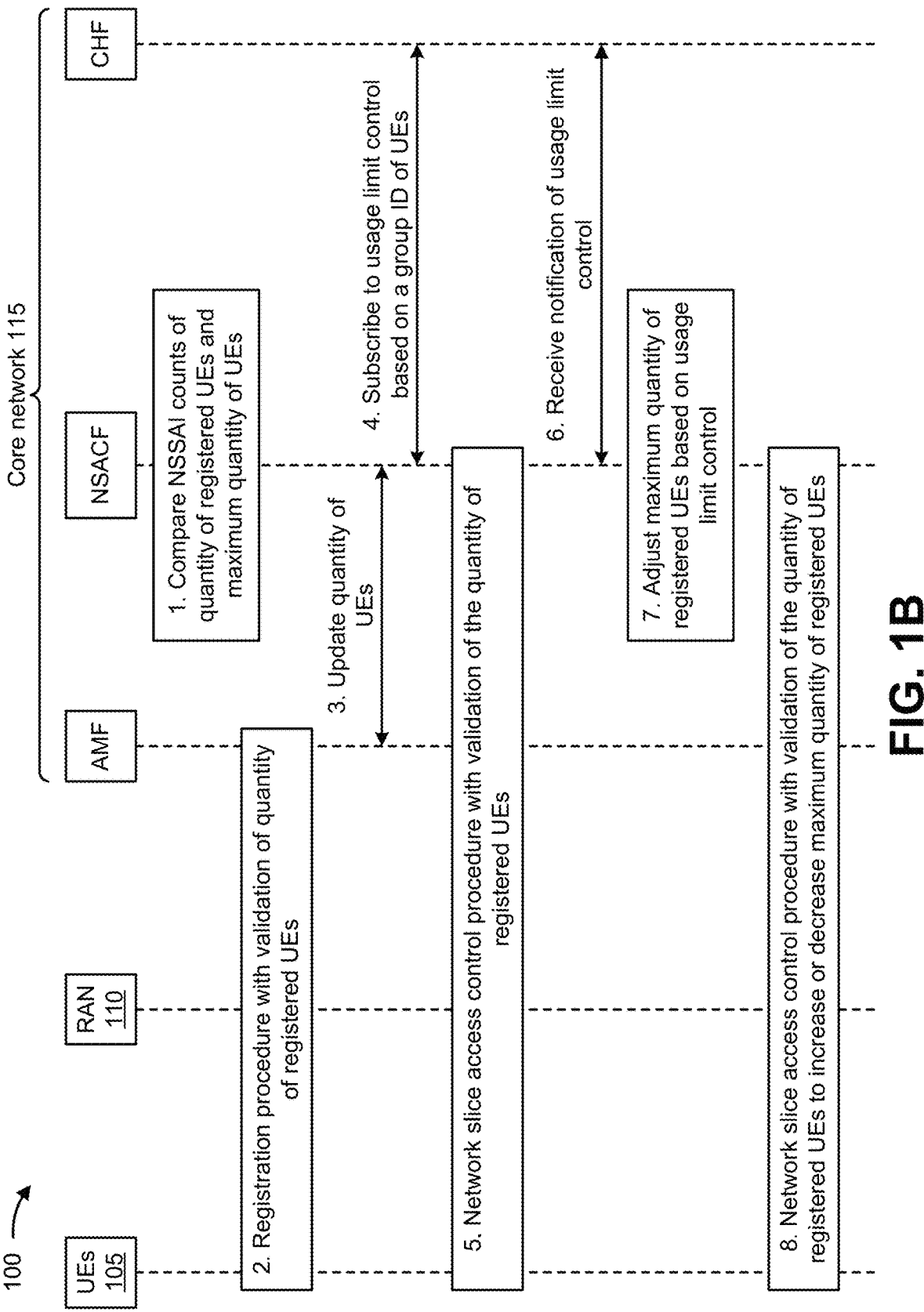
Figure 1C:
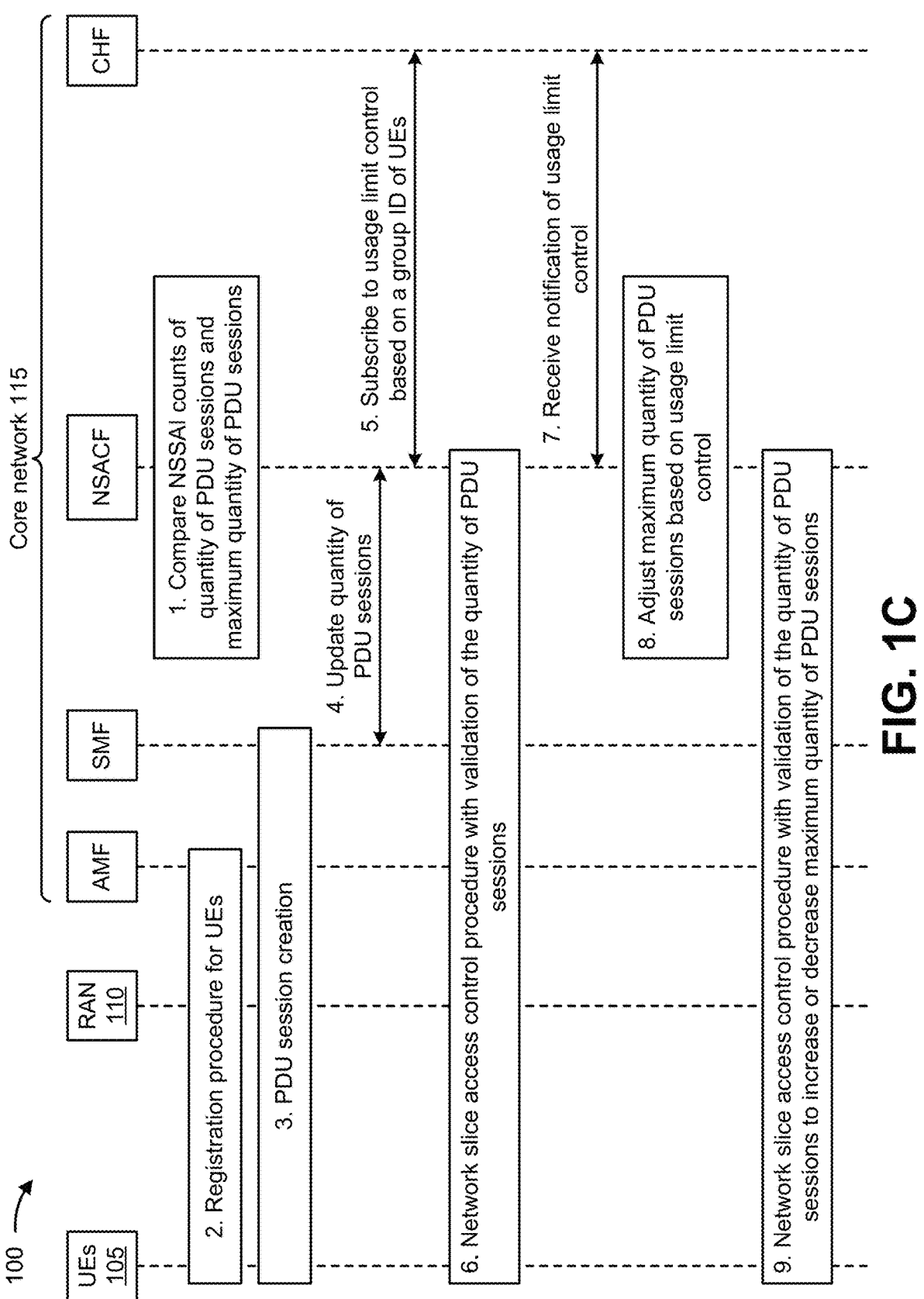
Figure 1D:
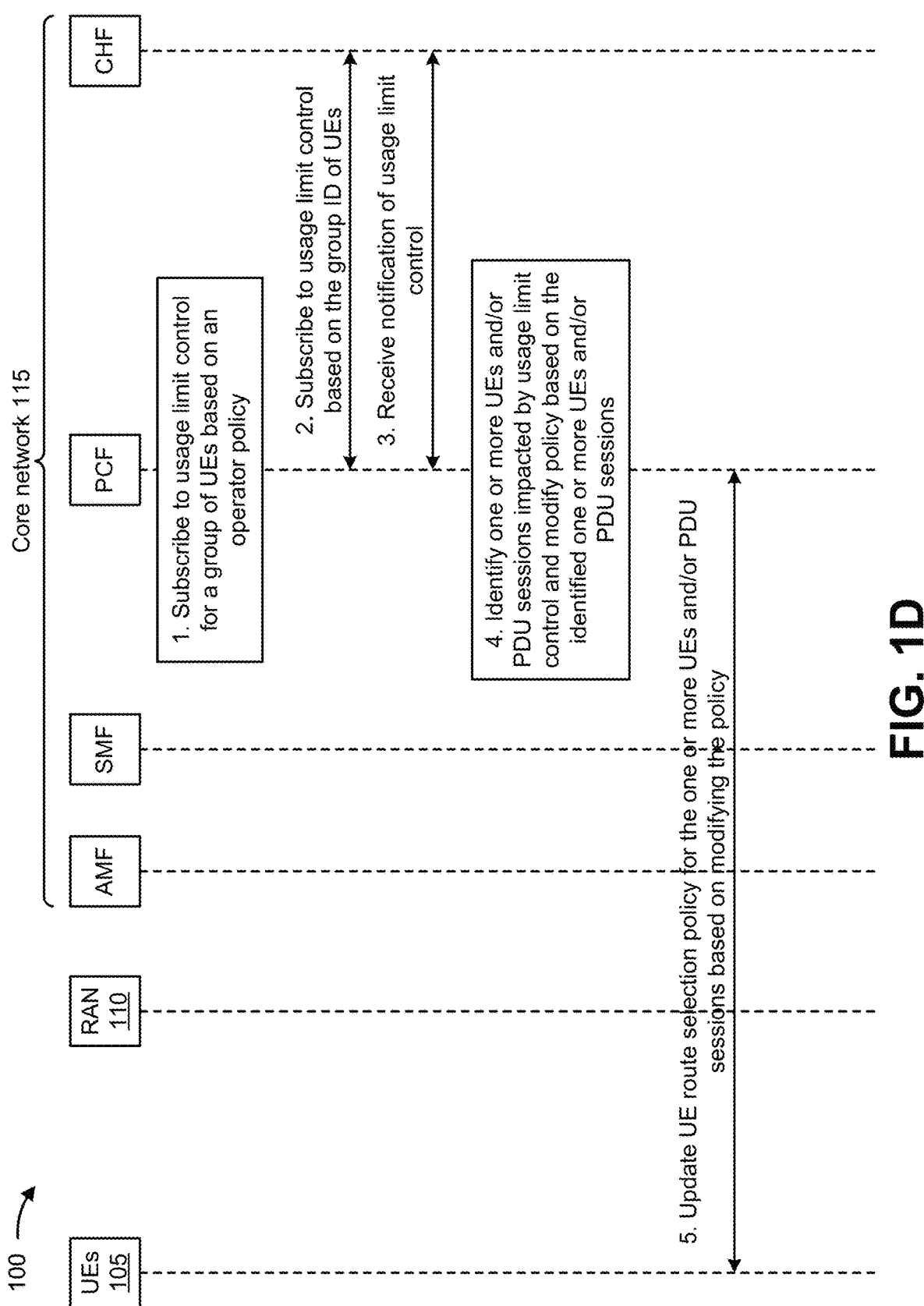

FIGS. 1B-1D are call flow diagrams depicting steps associated with supporting usage limits for a group of UEs 105 based on NSAC and policy and charging control. As shown at step 1 of FIG. 1B, the NSACF may compare network slice selection assistance information (NSSAI) counts, associated with the quantity of registered UEs 105 with the core network 115 (e.g., a network slice of the core network 115), and a maximum quantity of UEs 105 permitted to be registered with the network slice. For example, the network slice may include enough resources to the handle the maximum quantity of UEs 105, and the NSACF may ensure that the maximum quantity of UEs 105 is not exceeded for the network slice. As shown at step 2, the AMF may perform a registration procedure with a quantity of UEs 105 attempting to register with the core network 115, and may perform a validation procedure to validate the quantity of UEs 105. For example, the AMF may perform registration and validation (e.g., authentication) of the UEs 105, via the RAN 110. The AMF may be responsible for handling connection and mobility management tasks, such as registering and authenticating the UEs 105 for establishment of PDU sessions with a network slice. The AMF, alone or in combination with other network elements of the core network 115, may review information included in registration requests, and may deny registration and/or authentication of the UEs 105, for establishment of the PDU sessions, based on the information included in the registration requests. Alternatively, the AMF may allow registration and/or authentication of the UEs 105, for establishment of the PDU sessions, based on the information included in the registration requests.

As shown at step 3 of FIG. 1B, the AMF may provide, to the NSACF, an update of the quantity of UEs 105 registered with the network slice based on performing the registration and validation procedures. As shown at step 4, based on receiving the update of the quantity of UEs 105, the NSACF may subscribe to a usage limit control (e.g., from the CHF) for the UEs 105 based on a group identifier (ID) associated with the quantity of UEs 105. In some implementations, the NSACF may subscribe to the usage limit control for the UEs 105 based on multiple UE IDs corresponding to the quantity of UEs 105. The usage limit control may include a usage threshold that, when satisfied, may be utilized to modify a policy for the quantity of UEs 105 registered with the network slice. As shown at step 5, the NSACF may perform a network slice access control procedure with validation of the quantity of UEs 105 registered with the network slice.

As shown at step 6 of FIG. 1B, based on subscribing to the usage limit control, the NSACF may receive, from the CHF, a notification that includes the usage limit control for the quantity of UEs 105. As shown at step 7, the NSACF may adjust a maximum quantity of registered UEs 105 with the network slice based on the usage limit control. In some implementations, the NSACF may determine a modified policy for the UEs 105 registered with the network slice based on the usage limit control. In some implementations, when determining the modified policy for the UEs 105 registered with the network slice, the NSACF may determine to increase a maximum quantity of UEs 105 to be registered with the network slice based on the usage limit control. Alternatively, when determining the modified policy for the UEs 105 registered with the network slice, the NSACF may determine to decrease the maximum quantity of UEs 105 to be registered with the network slice based on the usage limit control.

As shown at step 8 of FIG. 1B, the NSACF may perform a network slice access control procedure with validation of the quantity of UEs 105 registered with the network slice to increase or decrease the maximum quantity of registered UEs 105 with the network slice. For example, the NSACF may cause the modified policy to be implemented for the UEs 105. In some implementations, when causing the modified policy to be implemented for the UEs 105, the NSACF may cause a network slice access control procedure to be performed that increases a maximum quantity of UEs 105 to be registered with the network slice. Alternatively, when causing the modified policy to be implemented for the UEs 105, the NSACF may cause a network slice access control procedure to be performed that decreases a maximum quantity of UEs 105 to be registered with the network slice. The NSACF may compare NSSAI counts, associated with the quantity of registered UEs 105 with the network slice, and the modified maximum quantity of UEs 105 permitted to be registered with the network slice. If the quantity of UEs 105 registered with the network slice exceeds the modified maximum quantity, the NSACF may cause services for one or more of the UEs 105 to be modified (e.g., to disconnect one or more UEs 105 from the network slice, to reduce a quality of service for one or more UEs 105, and/or the like).

As shown at step 1 of FIG. 1C, the NSACF may compare NSSAI counts, associated with PDU sessions of the UEs 105 with the core network 115 (e.g., a network slice of the core network 115), and a maximum quantity of PDU sessions permitted with the network slice. For example, the network slice may include enough resources to the handle the maximum quantity of PDU sessions, and the NSACF may ensure that the maximum quantity of UEs 105 is not exceeded for the network slice. As shown at step 2, the AMF may perform a registration procedure with a quantity of UEs 105 attempting to register with the core network 115, and may perform a validation procedure to validate the quantity of UEs 105. For example, the AMF may perform registration and validation (e.g., authentication) of the UEs 105, via the RAN 110. The AMF may be responsible for handling connection and mobility management tasks, such as registering and authenticating the UEs 105 for establishment of PDU sessions with a network slice, as further described above in connection with FIG. 1B.

As shown at step 3 of FIG. 1C, the SMF may create the PDU sessions for the UEs 105 with the network slice. For example, the SMF may create the PDU sessions for the UEs 105 based on the registration requests received from the UEs 105. As shown at step 4, the SMF may provide, to the NSACF, an update of the quantity of PDU sessions with the network slice based on creating the PDU sessions. As shown at step 5, based on receiving the update of the quantity of PDU sessions, the NSACF may subscribe to a usage limit control (e.g., from the CHF) for the UEs 105 (e.g., associated with the PDU sessions) based on a group ID associated with the quantity of UEs 105. In some implementations, the NSACF may subscribe to the usage limit control for the UEs 105 based on multiple UE IDs corresponding to the quantity of UEs 105. The usage limit control may include a usage threshold that, when satisfied, may be utilized to modify a policy for the quantity of PDU sessions registered with the network slice. As shown at step 6, the NSACF may perform a network slice access control procedure with validation of the quantity of PDU sessions with the network slice.

As shown at step 7 of FIG. 1C, based on subscribing to the usage limit control, the NSACF may receive, from the CHF, a notification that includes the usage limit control for the quantity of PDU sessions. As shown at step 8, the NSACF may adjust a maximum quantity of PDU sessions with the network slice based on the usage limit control. In some implementations, the NSACF may determine a modified policy for the PDU sessions with the network slice based on the usage limit control. In some implementations, when determining the modified policy for the PDU sessions with the network slice, the NSACF may determine to increase a maximum quantity of PDU sessions with the network slice based on the usage limit control. Alternatively, when determining the modified policy for the PDU sessions with the network slice, the NSACF may determine to decrease the maximum quantity of PDU sessions with the network slice based on the usage limit control.

As shown at step 9 of FIG. 1C, the NSACF may perform a network slice access control procedure with validation of the quantity of PDU sessions with the network slice to increase or decrease the maximum quantity of PDU sessions with the network slice. For example, the NSACF may cause the modified policy to be implemented for the PDU sessions of the UEs 105. In some implementations, when causing the modified policy to be implemented for the PDU sessions of the UEs 105, the NSACF may cause a network slice access control procedure to be performed that increases a maximum quantity of PDU sessions with the network slice. Alternatively, when causing the modified policy to be implemented for the PDU sessions of the UEs 105, the NSACF may cause a network slice access control procedure to be performed that decreases a maximum quantity of PDU sessions with the network slice. The NSACF may compare NSSAI counts, associated with the quantity of PDU sessions with the network slice, and the modified maximum quantity of PDU sessions permitted with the network slice. If the quantity of PDU sessions with the network slice exceeds the modified maximum quantity, the NSACF may cause services for one or more of the PDU sessions to be modified (e.g., to disconnect one or more PDU sessions from the network slice, to reduce a quality of service for one or more PDU sessions, and/or the like).

With reference to FIG. 1D, a group of UEs 105 may be associated with the core network 115 (e.g., may registered with a network slice of the core network 115, may include PDU sessions with the network slice of the core network 115, and/or the like). As shown at step 1 of FIG. 1D, the PCF may determine to subscribe to a usage limit control for the group of UEs 105 based on a policy associated with the core network 115 (e.g., an operator policy). As shown at step 2, the PCF may subscribe to the usage limit control (e.g., from the CHF) for the group of UEs 105 based on a group ID associated with the group of UEs 105 associated with the network slice. In some implementations, the PCF may subscribe to the usage limit control for the group of UEs 105 based on multiple UE IDs corresponding to the group of UEs 105. The usage limit control may include a usage threshold that, when satisfied, may be utilized to modify a policy for the group of UEs 105.

As shown at step 3 of FIG. 1D, based on subscribing to the usage limit control, the PCF may receive, from the CHF, a notification that includes the usage limit control for the group of UEs 105. As shown at step 4, the PCF may identify one or more UEs 105 and/or PDU sessions impacted by the usage limit control and may modify a policy based on the identified one or more UEs 105 and/or PDU sessions. In some implementations, the PCF may determine a modified policy for the group of UEs 105 and/or PDU sessions with the network slice based on the usage limit control. In some implementations, when determining the modified policy for the group of UEs 105 based on the usage limit control, the PCF may identify one or more of the group of UEs 105 that are impacted by the usage limit control, and may generate a modified policy that updates a user equipment route selection policy (URSP) for the one or more of the group of UEs 105 that are impacted by the usage limit control. In some implementations, when determining the modified policy for the group of UEs 105 based on the usage limit control, the PCF may identify one or more PDU sessions, of the group of UEs 105, that are impacted by the usage limit control, and may generate a modified policy that updates a URSP for the one or more PDU sessions that are impacted by the usage limit control.

As shown at step 5 of FIG. 1D, the PCF may update the URSP for the one or more UEs 105 and/or PDU sessions based on modifying the policy. For example, the PCF may cause the modified policy to be implemented for the one or more UEs 105 and/or the one or more PDU sessions. In some implementations, when causing the modified policy to be implemented for the one or more UEs 105 and/or the one or more PDU sessions, the PCF may cause services for the one or more UEs 105 and/or the one or more PDU sessions to be modified (e.g., to disconnect the one or more UEs 105, to reduce a quality of service for the one or more UEs 105, to disconnect one or more PDU sessions from the network slice, to reduce a quality of service for one or more PDU sessions, and/or the like).

In this way, the network device supports usage limits for a group of UEs based on NSAC and policy and charging control. For example, the PCF, the NSACF, and the CHF may be configured to support group-based usage limits and to enable the PCF and the NSACF to make determinations based on usage limits for a group of UEs. In particular, when subscribing for usage limits, the PCF and/or the NSACF may subscribe to usage limits based on a group identifier or based on multiple UE identifiers. Upon receiving a usage limits notification from the CHF, the PCF and/or the NSACF may determine a policy for a group of UEs based on the received usage limits. The notification from the CHF may cause the PCF to update multiple AM, SM, and UE policy control policy sessions based on the group identifier or the UE identifiers associated with the notification. Thus, the network device may conserve computing resources, networking resources, and/or other resources that would have otherwise been consumed by failing to implement usage limits for a group of UEs, failing to implement usage limits for a quantity of PDU sessions, failing to perform NSAC for a group of UEs and/or PDU sessions based on usage limits, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
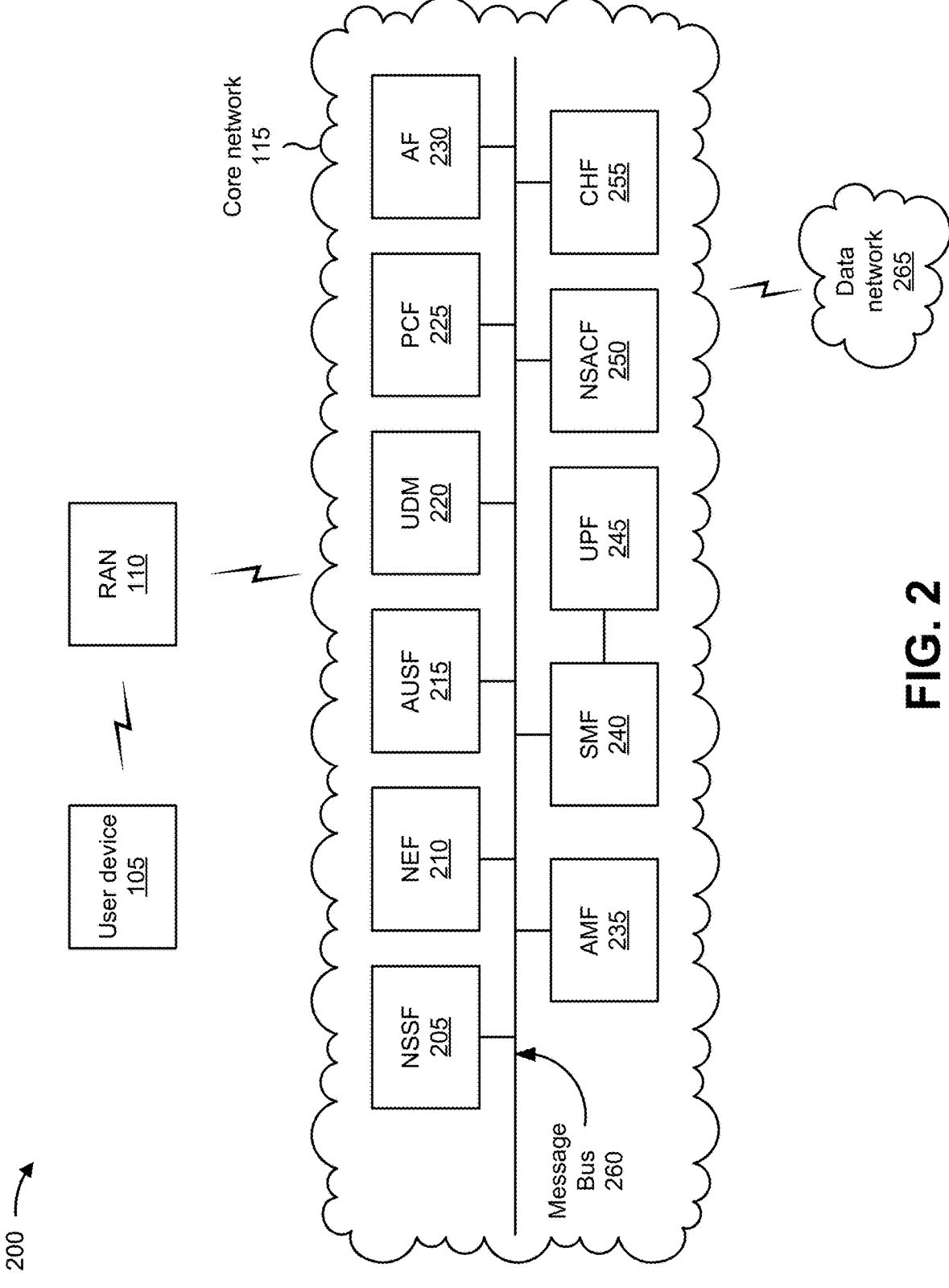
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, and a data network 265. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, a unified data management (UDM) component 220, a PCF 225, an application function (AF) 230, an AMF 235, an SMF 240, a user plane function (UPF) 245, an NSACF 250, and/or a CHF 255. These functional elements may be communicatively connected via a message bus 260. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM 220 includes one or more devices that store user data and profiles in the wireless telecommunications system. The UDM 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment Internet protocol (IP) address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The NSACF 250 includes one or more devices that control and monitor a quantity of registered UEs per S-NSSAI and a quantity of PDU sessions per S-NSSAI.

The CHF 255 includes one or more devices that enable the core network 115 to charge for features, such as a quality of service (QOS), service availability, latency, service level agreement features, bandwidth slice-based features, location-based features, data volume, throughput, reliability, security, energy efficiency, and/or the like.

The message bus 260 represents a communication structure for communication among the functional elements. In other words, the message bus 260 may permit communication between two or more functional elements.

The data network 265 includes one or more wired and/or wireless data networks. For example, the data network 265 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
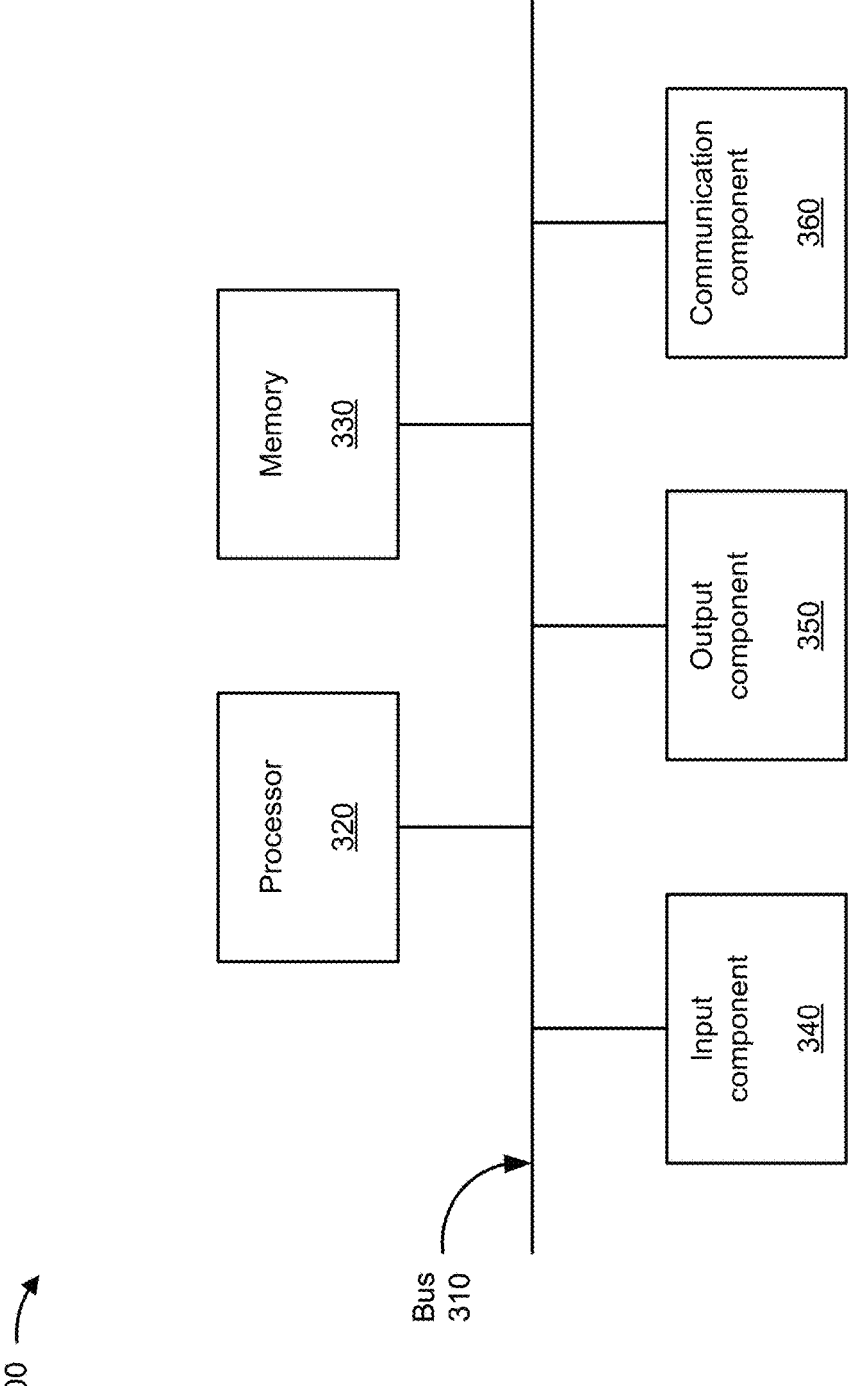
FIG. 3 is a diagram of example components of one or more devices of FIG. 2.

FIG. 3 is a diagram of example components of a device 300, which may correspond to the UE 105, the RAN 110, the NSSF 205, the NEF 210, the AUSF 215, the UDM 220, the PCF 225, the AF 230, the AMF 235, the SMF 240, the UPF 245, the NSACF 250, and/or the CHF 255. In some implementations, the UE 105, the RAN 110, the NSSF 205, the NEF 210, the AUSF 215, the UDM 220, the PCF 225, the AF 230, the AMF 235, the SMF 240, the UPF 245, the NSACF 250, and/or the CHF 255 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/ or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for supporting usage limits for a group of UEs based on NSAC and policy and charging control. In some implementations, one or more process blocks of FIG. 4 may be performed by a network device (e.g., the NSACF 250). In some implementations, one or more process blocks of FIG. 4 may be performed by another device or a group of devices separate from or including the network device, such as a RAN (e.g., the RAN 110), a PCF (e.g., the PCF 225), and/or a CHF (e.g., the CHF 255). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include generating a request for a usage limit control associated with a plurality of UEs registered with the network (block 410). For example, the network device may generate a request for a usage limit control associated with a plurality of UEs registered with the network, as described above. In some implementations, generating the request for the usage limit control associated with the plurality of UEs includes providing, in the request, a group identifier of the plurality of UEs. In some implementations, generating the request for the usage limit control associated with the plurality of UEs includes providing, in the request, user equipment identifiers corresponding to the plurality of UEs.

As further shown in FIG. 4, process 400 may include providing the request for the usage limit control to another network device of the network (block 420). For example, the network device may provide the request for the usage limit control to another network device of the network, as described above. In some implementations, the network device includes a network slice admission control function and the other network device includes a charging function. In some implementations, the network device includes a policy control function and the other network device includes a charging function.

As further shown in FIG. 4, process 400 may include receiving, based on the request, the usage limit control from the other network device (block 430). For example, the network device may receive, based on the request, the usage limit control from the other network device, as described above.

As further shown in FIG. 4, process 400 may include determining a modified policy for the plurality of UEs based on the usage limit control (block 440). For example, the network device may determine a modified policy for the plurality of UEs based on the usage limit control, as described above. In some implementations, determining the modified policy for the plurality of UEs based on the usage limit control includes determining to increase a maximum quantity of UEs to be registered with the network. In some implementations, determining the modified policy for the plurality of UEs based on the usage limit control includes determining to decrease a maximum quantity of UEs to be registered with the network.

In some implementations, determining the modified policy for the plurality of UEs based on the usage limit control includes determining to increase a maximum quantity of protocol data unit sessions for the plurality of UEs. In some implementations, determining the modified policy for the plurality of UEs based on the usage limit control includes determining to decrease a maximum quantity of protocol data unit sessions for the plurality of UEs. In some implementations, determining the modified policy for the plurality of UEs based on the usage limit control includes identifying one or more of the plurality of UEs that are impacted by the usage limit control, and updating a user equipment route selection policy for the one or more of the plurality of UEs that are impacted by the usage limit control. In some implementations, determining the modified policy for the plurality of UEs based on the usage limit control includes identifying one or more protocol data unit sessions, of the plurality of UEs, that are impacted by the usage limit control, and updating a user equipment route selection policy for the one or more protocol data unit sessions that are impacted by the usage limit control.

As further shown in FIG. 4, process 400 may include causing the modified policy to be implemented for the plurality of UEs (block 450). For example, the network device may cause the modified policy to be implemented for the plurality of UEs, as described above. In some implementations, causing the modified policy to be implemented for the plurality of UEs includes causing a network slice access control procedure to be performed that increases or decreases a maximum quantity of UEs to be registered with the network. In some implementations, causing the modified policy to be implemented for the plurality of UEs includes causing a network slice access control procedure to be performed that increases or decreases a maximum quantity of protocol data unit sessions for the plurality of UEs.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

generating, by a network device of a network, a request for a usage limit control associated with a plurality of user equipments (UEs) registered with a network slice of the network, wherein the usage limit control includes a usage threshold utilized to modify a policy for the network slice;

providing, by the network device, the request for the usage limit control to another network device of the network;

receiving, by the network device and based on the request, the usage limit control from the other network device;

determining, by the network device, a modified policy for the network slice for the plurality of UEs based on the usage limit control by:

identifying one or more protocol data unit sessions, of the plurality of UEs, that are impacted by the usage limit control, and updating a user equipment route selection policy for the one or more protocol data unit sessions that are impacted by the usage limit control; and causing, by the network device, the modified policy to be implemented for the plurality of UEs.

2. The method of claim 1, wherein the network device includes a network slice admission control function and the other network device includes a charging function.

3. The method of claim 1, wherein the network device includes a policy control function and the other network device includes a charging function.

4. The method of claim 1, wherein generating the request for the usage limit control associated with the plurality of UEs comprises:

providing, in the request, a group identifier of the plurality of UEs.

5. The method of claim 1, wherein generating the request for the usage limit control associated with the plurality of UEs comprises:

providing, in the request, user equipment identifiers corresponding to the plurality of UEs.

6. The method of claim 1, wherein determining the modified policy for the plurality of UEs based on the usage limit control comprises:

determining to increase a maximum quantity of UEs to be registered with the network.

7. The method of claim 1, wherein determining the modified policy for the plurality of UEs based on the usage limit control comprises:

determining to decrease a maximum quantity of UEs to be registered with the network.

8. A network device of a network, comprising:

one or more processors configured to:

generate a request for a usage limit control associated with a plurality of user equipments (UEs) registered with a network slice of the network, wherein the request includes a group identifier of the plurality of UEs or user equipment identifiers corresponding to the plurality of UEs, and wherein the usage limit control includes a usage threshold utilized to modify a policy for the network slice;

provide the request for the usage limit control to another network device of the network;

receive, based on the request, the usage limit control from the other network device;

determine a modified policy for the network slice for the plurality of UEs based on the usage limit control by being configured to:

identify one or more protocol data unit sessions, of the plurality of UEs, that are impacted by the usage limit control, and update a user equipment route selection policy for the one or more protocol data unit sessions that are impacted by the usage limit control; and cause the modified policy to be implemented for the plurality of UEs.

9. The network device of claim 8, wherein the one or more processors, to determine the modified policy for the plurality of UEs based on the usage limit control, are configured to:

determine to increase a maximum quantity of protocol data unit sessions for the plurality of UEs.

10. The network device of claim 8, wherein the one or more processors, to determine the modified policy for the plurality of UEs based on the usage limit control, are configured to:

determine to decrease a maximum quantity of protocol data unit sessions for the plurality of UEs.

11. The network device of claim 8, wherein the one or more processors, to determine the modified policy for the plurality of UEs based on the usage limit control, are configured to:

identify one or more of the plurality of UEs that are impacted by the usage limit control; and update a user equipment route selection policy for the one or more of the plurality of UEs that are impacted by the usage limit control.

12. The network device of claim 8, wherein the one or more processors, to cause the modified policy to be implemented for the plurality of UEs, are configured to:

cause a network slice access control procedure to be performed that increases or decreases a maximum quantity of UEs to be registered with the network.

13. The network device of claim 8, wherein the one or more processors, to cause the modified policy to be implemented for the plurality of UEs, are configured to:

cause a network slice access control procedure to be performed that increases or decreases a maximum quantity of protocol data unit sessions for the plurality of UEs.

14. A non-transitory computer-readable medium storing a set of instructions, the set of instructions comprising:

one or more instructions that, when executed by one or more processors of a network device of a network, cause the network device to:

generate a request for a usage limit control associated with a plurality of user equipments (UEs) registered with a network slice of the network, wherein the network device includes a network slice admission control function or a policy control function, and wherein the usage limit control includes a usage threshold utilized to modify a policy for the network slice;

provide the request for the usage limit control to another network device of the network;

receive, based on the request, the usage limit control from the other network device;

determine a modified policy for the plurality of UEs based on the usage limit control by causing the network device to:

identify one or more protocol data unit sessions, of the plurality of UEs, that are impacted by the usage limit control, and update a user equipment route selection policy for the one or more protocol data unit sessions that are impacted by the usage limit control; and cause the modified policy to be implemented for the plurality of UEs.

15. The non-transitory computer-readable medium of claim 14, wherein the one or more instructions, that cause the network device to generate the request for the usage limit control associated with the plurality of UEs, cause the network device to:

provide, in the request, a group identifier of the plurality of UEs or user equipment identifiers corresponding to the plurality of UEs.

16. The non-transitory computer-readable medium of claim 14, wherein the one or more instructions, that cause the network device to determine the modified policy for the plurality of UEs based on the usage limit control, cause the network device to:

determine to increase or decrease a maximum quantity of UEs to be registered with the network.

17. The non-transitory computer-readable medium of claim 14, wherein the one or more instructions, that cause the network device to determine the modified policy for the plurality of UEs based on the usage limit control, cause the network device to:

determine to increase or decrease a maximum quantity of protocol data unit sessions for the plurality of UEs.

18. The non-transitory computer-readable medium of claim 14, wherein the one or more instructions, that cause the network device to determine the modified policy for the plurality of UEs based on the usage limit control, cause the network device to:

identify one or more of the plurality of UEs that are impacted by the usage limit control; and update a user equipment route selection policy for the one or more of the plurality of UEs that are impacted by the usage limit control.

19. The network device of claim 8, wherein the network device includes a network slice admission control function and the other network device includes a charging function.

20. The network device of claim 8, wherein the network device includes a policy control function and the other network device includes a charging function.

* * * * *